US012572996B2

(12) United States Patent
Niemi et al.

(10) Patent No.: US 12,572,996 B2
(45) Date of Patent: Mar. 10, 2026

(54) FRACTIONALIZED TRANSFERS OF SENSOR DATA FOR STREAMING AND LATENCY-SENSITIVE APPLICATIONS

(71) Applicant: NVIDIA Corporation, Santa Clara, CA (US)

(72) Inventors: Aki Petteri Niemi, Vancouver (CA); Sean Midthun Pieper, Waldport, OR (US)

(73) Assignee: NVIDIA Corporation, Santa Clara, CA (US)

( * ) Notice: Subject to any disclaimer, the term of this patent is extended or adjusted under 35 U.S.C. 154(b) by 466 days.

(21) Appl. No.: 17/987,109

(22) Filed: Nov. 15, 2022

(65) Prior Publication Data

US 2024/0161221 A1     May 16, 2024

(51) Int. Cl.
G06T 1/20 (2006.01)
G06F 13/24 (2006.01)
G06T 1/60 (2006.01)

(52) U.S. Cl.
CPC .............. G06T 1/20 (2013.01); G06F 13/24 (2013.01); G06T 1/60 (2013.01); G06F 2213/0026 (2013.01); G06F 2213/0038 (2013.01)

(58) Field of Classification Search
CPC ... G06T 1/20; G06T 1/60; G06F 13/24; G06F 2213/0026; G06F 2213/0038
USPC .......................................................... 382/100
See application file for complete search history.

(56) References Cited

U.S. PATENT DOCUMENTS 10,572,390 B2 * 2/2020 Petkov ................... G06F 3/0626
2018/0096496 A1 * 4/2018 Lobaugh ................ G06T 11/001

OTHER PUBLICATIONS

NPL: Results Publication Date Range: Mar. 29, 1991 to Sep. 23, 2025.*

* cited by examiner

*Primary Examiner* — Quang N Vo
(74) *Attorney, Agent, or Firm* — Lowenstein Sandler LLP

(57) ABSTRACT
Disclosed are apparatuses, systems, and techniques that implementing fractionalized data transfers between processing devices in real-time data generating and streaming applications. The techniques include but are not limited to processing, by a first processing device, an image data to generate a plurality of portions of an image, responsive to generating a first portion of the plurality of portions of the image, storing the first portion in a first memory device of the first processing device, setting a completion indicator for the first portion, and causing the first portion to be provided to a second processing device.

21 Claims, 8 Drawing Sheets

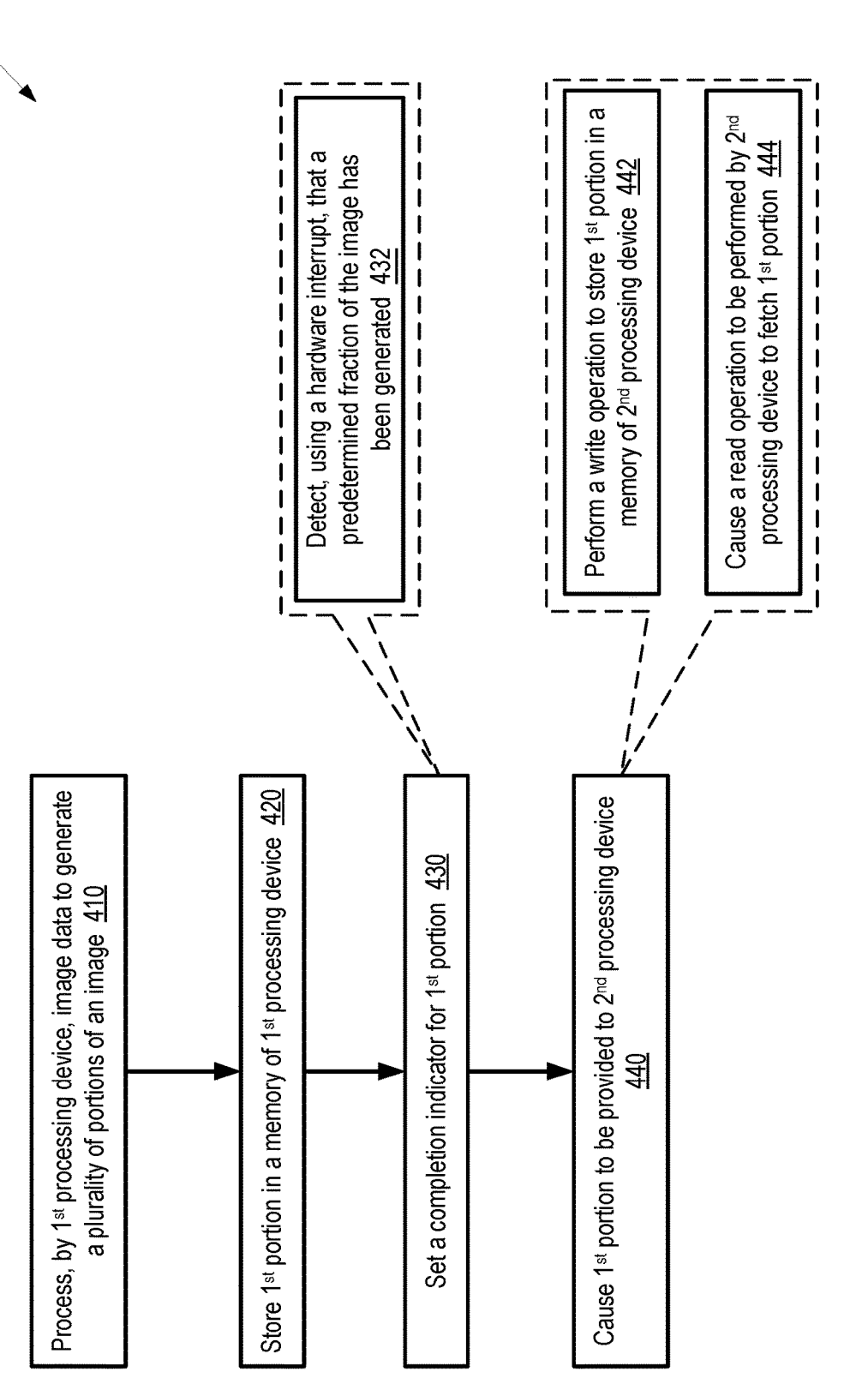

Process, by 1st processing device, image data to generate a plurality of portions of an image 410

Store 1st portion in a memory of 1st processing device 420

Set a completion indicator for 1st portion 430

Detect, using a hardware interrupt, that a predetermined fraction of the image has been generated 432

Cause 1st portion to be provided to 2nd processing device 440

Perform a write operation to store 1st portion in a memory of 2nd processing device 442

Cause a read operation to be performed by 2nd processing device to fetch 1st portion 444

Receive 2nd portion from 1st processing device 710

Receive a corrupted portion indicator indicating that 2nd second portion has been generated with error(s) 720

Identify uncorrupted region of 2nd portion using the corrupted portion indicator 732

Discard 2nd portion 730

Perform the image processing operation 740

FRACTIONALIZED TRANSFERS OF SENSOR DATA FOR STREAMING AND LATENCY-SENSITIVE APPLICATIONS

TECHNICAL FIELD

At least one embodiment pertains to processing resources and techniques that are used to improve efficiency and decrease latency of data transfers in computational applications. For example, at least one embodiment pertains to efficient transfer of image and video data between computing devices in safety-sensitive applications, including autonomous driving applications.

BACKGROUND

In safety-sensitive applications, such as autonomous or semi-autonomous driving systems, large amounts of sensor data, e.g., camera data, light detection and ranging (lidar) data, radio detection and ranging (radar) data, ultrasonic data, sonar data, etc., have to be processed quickly and accurately. Collected sensor data typically has to be propagated between various processing resources, e.g., from a sensor to an image signal processing (ISP) module for initial processing, from ISP to various computer vision (CV) applications for object recognition and tracking, from CV applications to driving control systems, and so on. Sensor data often has a large volume and is collected at a high rate by multiple sensors and then processed by a number of complex software applications.

BRIEF DESCRIPTION OF DRAWINGS

FIG. 4 is a flow diagram of an example method of fractionalized data transfers, as may be performed by a transmitting device, according to at least one embodiment;

DETAILED DESCRIPTION

Figure 1:
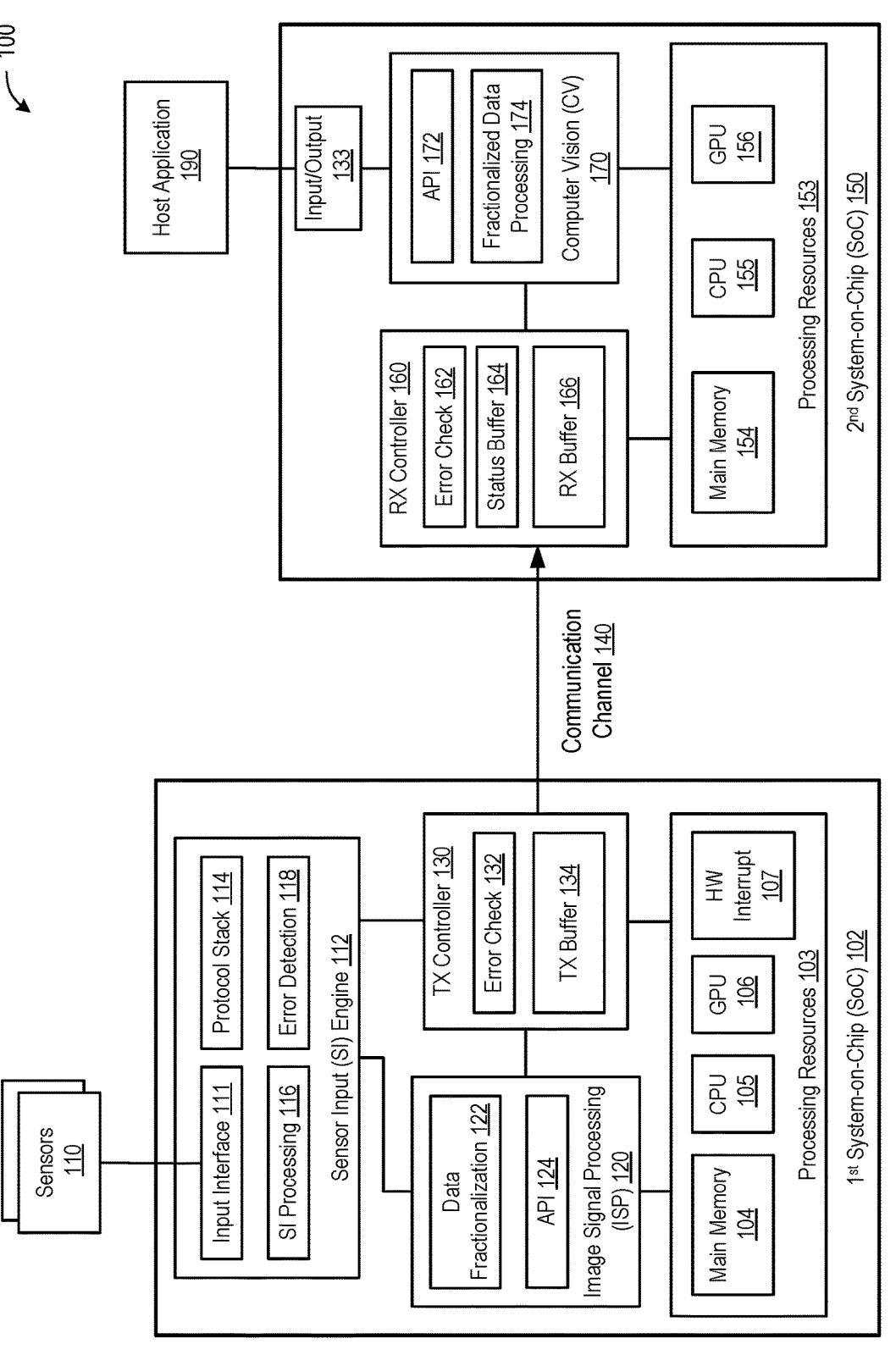
FIG. 1 is a block diagram of an example system capable of implementing fractionalized data transfers between processing devices in real-time data generating and streaming applications, according to at least one embodiment.

Sensor data, e.g., video and image camera data, often has a large size, commonly meeting or exceeding several megapixels per frame (image), collected as a continuous stream of 30 or more frames (images) per second. As a result, multiple processing devices are often deployed to handle processing of such data-intensive streams. The processing devices are often implemented as system-on-chip (SoC) integrated circuits dedicated to specialized tasks. For example, one SoC can be used to process raw sensor data (ISP processing) and generate images (e.g. demosaiced images, such as RGB images) in one of several digital image formats. A second SoC can then implement various computer vision algorithms to detect objects in the pixelated images and, possibly, track the motion of those objects with time. A third SoC can use the information about the detected/tracked objects to identify a driving path for the autonomous vehicle and to output instructions to the vehicle's drivetrain, braking system, signaling system, and so on. This SoC specialization improves efficiency of data processing but creates latency bottlenecks during data transfers between SoCs. SoCs may communicate the data via various communication channels, including Peripheral Component Interconnect Express (PCIe) connection, a Compute Express Link (CXL) connection, or an NVLink connection, and the like. The latency of data transfers is often exacerbated by the fact that multiple sets of sensing data (e.g., frames collected by multiple cameras) are collected synchronously and may reach SoC-to-SoC links at about the same time. This leads to communication bursts of data every 1/f seconds, where f is the rate of data acquisition. At other times, in contrast, communication channel(s) remain idle. Such uneven utilization of the communication channel(s) results in latency that is detrimental for safety-sensitive applications, such as autonomous driving systems, safety-monitoring systems, industrial control systems, and any other applications that involve processing and communicating large amounts of data.

Aspects and embodiments of the instant disclosure address these and other technological challenges by disclosing methods and systems that facilitate fractionalized communication of units of data (e.g., image or video frames). This eliminates bursts of data, reduces latency of data communications, and improves efficiency of data retransmission in the instances of data corruption. More specifically, the disclosed techniques include hardware and software support for fractionalizing image frames (or any other units of data) into portions and communicating the fractionalized portions over SoC-to-SoC communication links. For example, a first SoC may obtain image data, e.g., receive raw data from one or more sensors, such as cameras, sonars, lidars, radars, and so on. The first SoC may perform initial image signal processing and generate image frames. Each generated frame may be stored in a buffer of the first SoC that is accessible to a communication link controller (e.g., a root complex of the PCIe interconnect) of the first SoC. A hardware interrupt (or a software flag) may be programmed to trigger at a time when a first portion (1/Mth fraction) of the image frame is being generated by the ISP module. The link controller may detect the interrupt (flag) and perform a write operation to store the first portion in a buffer of the second SoC. Alternatively, the link controller may relay the interrupt (flag) to a link controller of the second SoC, which may perform a read operation to fetch the first portion of the image from the first SoC and store the first portion in the buffer of the second SoC. Similar operations may be used for the remaining M−1 portions of the image. As a result, transmission of the mth portion occurs while the m+1th portion is being generated so that only the last portion of the image remains to be communicated to the second SoC after the image generation has been completed.

Further advantages of the disclosed techniques include more efficient handling of the instances of corrupted frames compared with existing systems. Presently, a frame that has an uncorrectable (by an error correction code) error has to be discarded in its entirety in streaming and/or safety-sensitive applications. In the course of fractionalized data communications, an unrecoverable error localized in a particular portion of the frame may be addressed by merely discarding the respective portion while processing (and providing to a host application) other, error-free (or error-correctable) portions of the same frame. The communicated remaining portions may still provide valuable information about the environment. For example, the discarded portion may be located at the outskirts of the frame while the remaining portions may provide a central view from the camera. In some embodiments, the first SoC may still communicate the corrupted portion(s) to the second SoC together with an indication of which corrupted portion(s) are to be discarded. In some embodiments, the first SoC may discard the corrupted portion without notifying the second SoC while the second SoC may identify the portion(s) as missing based on a gap in a sequence of identifiers of the received portions. In other implementations, the second SoC may read the corrupted portion from the first SoC together with the indicator informing the second SoC that the read portion is to be discarded.

The advantages of the disclosed techniques include but are not limited to reducing or minimizing latency of SoC-to-SoC communications of real-time generated data both in the course of normal data generation and the instances of corrupted data. The reduced latency improves data transfer rates and, therefore, enhances safety of automotive and other safety-sensitive systems and applications.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

System Architecture

FIG. 1 is a block diagram of an example system 100 capable of implementing fractionalized data transfers between processing devices in real-time data generating and streaming applications, according to at least one embodiment. As depicted in FIG. 1, system 100 may include multiple processing devices, including a first SoC 102 connected via a communication channel 140 to a second SoC 150. Each of first SoC 102 and second SoC 150 may be an integrated circuit implemented on a single substrate (or microchip) that supports multiple computer components. More specifically, first SoC 102 may include a number of processing resources 103, including main memory 104, one or more central processing units (CPUs) 105, one or more graphics processing units (GPUs) 106, and/or various other components that are not explicitly illustrated in FIG. 1, such as wireless modems, network cards, local buses, graphics cards, parallel processing units (PPUs), data processing units (DPUs), or accelerators, and so on. Similarly, second SoC 150 may include processing resources 153, such as main memory 154, one or more CPUs 155, one or more GPUs 156, and/or other components that are not explicitly illustrated in FIG. 1.

First SoC 102 and/or second SoC 150 may support one or more applications, including real-time data streaming and/or processing applications, e.g., host application 190, which may be executed, e.g., on the second SoC 150, but may also be executed by first SoC 102, or by a third device. In some embodiments, host application 190 may be or include an autonomous driving application. In some embodiments, first SoC 102 may support processing of sensor data collected and/or generated by one or more sensors 110. Sensor(s) 110 may include camera sensors, radar sensors, lidar sensors, sonar sensors, and the like. Sensor(s) 110 may generate sensor data in any suitable unprocessed or minimally processed (e.g., sensor-specific and/or proprietary) raw data format. Sensor data generated by sensor(s) 110 may be collected periodically with some frequency f, e.g., correspond to camera acquisition rate, lidar scanning frequency, and the like.

Sensor data generated by sensor 110 may be received by a sensor input (SI) engine 112. Sensor engine 112 may include an input interface 111, a protocol stack 114, an SI processing 116, and error detection module 118, and other components and modules. In some embodiments, SI processing 116 may be a hardware component, e.g., a dedicated sensor input processor, which performs deserialization of sensing data streamed from sensor(s) 110. For example, SI processing 116 may include a Tegra® NVIDIA chip or any other suitable component capable of processing the sensing data and formatting the processed data into a format that can be understood by an image signal processing (ISP) 120. SI engine 112 may receive the sensing data via any suitable input interface 111, e.g., a serial interface, e.g., a camera serial interface (CSI), which such as a mobile industry processor interface (MIPI) CSI, in some embodiments. The sensing data received via input interface 111 may be processed by a suitable protocol stack 114, e.g., an MIPI CSI transfer protocol stack, which may include hardware components and/or firmware modules implementing a physical layer, a lane merger layer, a low level protocol layer, a pixel-to-byte conversion layer, an application layer, and the like. In some embodiments, input interface 111 may support multiple selectable data transmission rates. In some embodiments, input interface 111 may support data fusion of sensing data collected from different sensors 110, e.g., fusing camera data with radar data, lidar data, and the like. Error detection module 118 may verify integrity of data packets (e.g., CSI data packets) streaming from sensor(s) 110 via input interface 111. Error detection module 118 may use redundant data (checksums, parity data, etc.) that is streamed together with data packets to facilitates locations (and in some instances recovery) of data packets that is lost or corrupted during data generation or transfer from sensor(s) 110 to SI engine 112. For example, error detection module 118 may apply verify checksums, parity values, or any other error correction data. Error detection module 118 may also detect missing data packets. In some embodiments, error detection module 118 may use error correction data to repair corrupted data packets. In those instances where data packets cannot be repaired and/or some data packets are missing, error detection module 118 may store identifiers of missing and/or corrupted data packets. etc.

Serialized data generated by SI engine 112 may be provided to image signal processing (ISP) 120 that may include a collection of software/firmware executable codes, libraries, and various resources that are stored in main memory 104 and executed by CPU 105 and/or GPU 106. In some embodiments, various serial tasks of ISP 120 may be executed by CPU 105 and various parallel tasks may be executed by GPU 106. In some embodiments, both serial tasks and parallel tasks of ISP 120 may be executed by CPU 105, by GPU 106, or by a combination of CPU 105 and GPU 106. ISP 120 may perform any suitable image processing of sensing data, with may include noise filtering, de-blurring/ sharpening, contrast modification, color adjustment, image merging (e.g., merging multiple images obtained by narrow-view cameras), image cropping and/or downscaling, and other image pre-processing. In some embodiments, ISP 120 may combine images acquired with multiple exposures, such as Standard Dynamic Range (SDR) exposures (e.g., a short exposure, a long exposure, an extra-long exposure, etc.), to generate merged pixel values that form a High Dynamic Range (HDR) image. ISP 120 may generate demosaiced images based on raw sensor data. Demosaiced images may include pixels having one or more intensity values, e.g., black-and-white intensity values, RGB (red, green, blue) intensity values, CMYK (cyan, magenta, yellow, key) intensity values, or intensity values of any other color scheme. Generating images by ISP 120 may include data compressing. ISP 120 may generate images in any digital format, e.g., TIFF, PNG, GIF, JPEG, BMP, or any other format, including any suitable proprietary formats. Various formats and layouts of images may include pixel data represented in blocklinear format, pitch-linear format, sub-sampled format, and the like. For example, the pixel data may be outputted in the YUV420 format, in which a Y luma channel is combined with a U and V chroma channels, with the chroma channels having a different resolution than the luma channel (e.g., one half of the resolution of the luma channel). Additionally, individual pixels may have different formats, including packed (or interleaved) pixels, planar pixels, semi-planar pixels, and the like, each format specifying a particular way in which pixel data is stored in memory. In some embodiments, ISP 120 may combine images of different types, e.g., augmenting camera images with radar or lidar sensor data (such as associating various points in the camera images with distance data). ISP 120 may produce individual images and/or a time series of related images (e.g., video frames).

In some embodiments, ISP 120 may include a data fractionalization module 122 that outputs fractions of image frames once those fractions have been generated by ISP 120 and stores the output fractions in a buffer (or any other memory device) accessible to a transmitting (TX) controller 130, e.g., a TX buffer 134. In some embodiments, TX buffer 134 may be a high-speed cache. In some embodiments, the images and or EC data may be stored in main memory 104 or in a GPU memory (not shown in FIG. 1), e.g., at any designated memory address or a range of memory addresses.

Operations of data fractionalization module 122 may be directed and controlled using an application programming interface (API) 124. API 124 may include a set of user-configurable instructions for controlling fractionalized data transfers from the first SoC 102 to the second SoC 150, e.g., as may be specified by CV application 170, a host application 190, and/or any other application that may be instantiated on the first SoC 102, the second SoC 150, and/or some other computing device communicatively coupled to the first SoC 102 and/or the second SoC 150. API 124 may define a size S of a transferred unit of data. In the instances of transferred images, video frames, etc., the size S may be defined in bytes (e.g., 1 Mb, 8 Mb, etc.), rows/columns of pixels, blocks of pixels of a specific size, or in any other way. The application may further define a size of a portion of the unit of data for fractionalized data transfers. For example, once 1/Mth fraction of an image (or any other unit of data), e.g., a portion of size S/M, has been processed by ISP 120 and stored in TX buffer 134, TX controller 130 may transfer this portion to a second SoC 150. More specifically, in some embodiments, API 124 may configure an interrupt, e.g., a hardware (HW) interrupt 107 to detect that a portion of size S/M has been stored in TX buffer 134 and cause TX controller 130 to transfer this portion of the image to RX controller 160. In some embodiments, the interrupt may be a software interrupt. In some embodiments, the interrupt may be configured to activate when size S/M+E has been stored in TX buffer 134, where E is an additional portion of data that may be used by a downstream application (e.g., CV application 170) to process the S/M portion. For example, processing a line of pixels by the downstream application may involve using one or more adjacent lines. Accordingly, a chunk E may be added to the 1/Mth fraction of the frame data S before the fraction is transferred to the second SoC 150.

TX controller 130 may be communicating with RX controller 160 via communication channel 140. For example, TX controller 130 and/or RX controller 160 may include a root complex supporting PCIe operations and one or more switches to route messages between the first SoC 102 and the second SoC 150 (and other devices). TX controller 130 and/or RX controller 160 may include a protocol stack supported by a physical layer, a data link layer, a transaction layer, and/or any other layers as may be defined by a specific communication protocol. TX controller 130 and/or RX controller 160 may also include a stack of layers (not shown in FIG. 1) that facilitates interaction of the respective controller with a host device (e.g., the first SoC 102 or the second SoC 150).

TX controller 130 may detect HW interrupt 107 (or a software flag) indicating that a portion, e.g., a first portion, of an image has been stored in TX buffer 134. Error check module 132 of TX controller 130 may also perform verification of the integrity of the first portion. For example, error check module 132 may access stored (e.g., by error detection module 118) identities of corrupted or missing data packets. Additionally, error check module 132 may check for additional errors than may have occurred during processing of ISP 120 of the respective portion. In some embodiments, error check module 132 may attempt to correct for such additional errors.

If error check module 132 detects no errors of ISP 120 (and no missing/corrupted data packets input into ISP 120 during processing of the first portion), error check module 132 may cause TX controller 130 to communicate the first portion to RX controller 160, e.g., to store the first portion in RX buffer 166. TX controller 130 may additionally store a good portion indicator in a status buffer 164 of RX controller 160 that indicates to CV application 170 that a good (error-free) portion has arrived.

If error check module 132 detects errors of processing ISP 120 (or that ISP 120 processed the first portion with missing/corrupted data packets), error check module 132 may cause TX controller 130 to perform one of the following. TX controller 130 may scrap the first portion by not communicating the first portion to RX controller 160. TX controller 130 may additionally store a bad portion indicator in status buffer 164 of RX controller 160. Alternatively, TX controller 130 may communicate the first portion to RX controller 160 (storing the first portion in RX buffer 166) and may also store the bad portion indicator in a status buffer 164. The bad portion indicator stored in status buffer 164 may indicate to CV application 170 that a bad (corrupted) portion has arrived or that no portion has arrived.

In some embodiments, instead of performing store (write) operations by TX controller 130 into RX buffer 166, RX controller 160 may perform a read operation fetching the first portion of the image from TX buffer 134 and store the first portion in RX buffer 166. Such a read operation may be performed responsive to TX controller 130 storing a good portion indicator in status buffer 164 of RX controller 160, or a similar status buffer of TX controller 130, which may be polled (e.g., periodically) by RX controller 160. In the instance where RX controller 160 detects a bad portion indicator in status buffer 164 (or in a similar status buffer on TX controller 130), RX controller 160 may abstain from performing the read operation to fetch the first portion.

Similar operations may be performed to transfer the remaining M−1 portions of the image. As a result, transmission of the mth portion occurs while the m+1th portion is being generated so that only the last portion of the image remains to be communicated to the second SoC 150 after the image generation has been completed. In some embodiments, portions of the image may be collected in RX buffer 166 until the full image is received. In some embodiments, each received, e.g., mth, portion of the image may be passed on to an application that consumes the images, e.g., CV application 170, while the next m+1th portion is still being transferred over the communication channel 140. Processing of portions of images may be performed by fractionalized data processing 174, whose operations may be programmed and controlled using an API 172. In some embodiments, API 172 may be configured by host application 190, and/or any other application that may be instantiated on second SoC 150, and/or some other computing device communicatively coupled second SoC 150. Output of CV application 170, e.g., locations and types of recognized objects, trajectories of the recognized objects, and/or any other determined data may be communicated to host application 190 using a suitable Input/Output interface 133.

Figure 2:
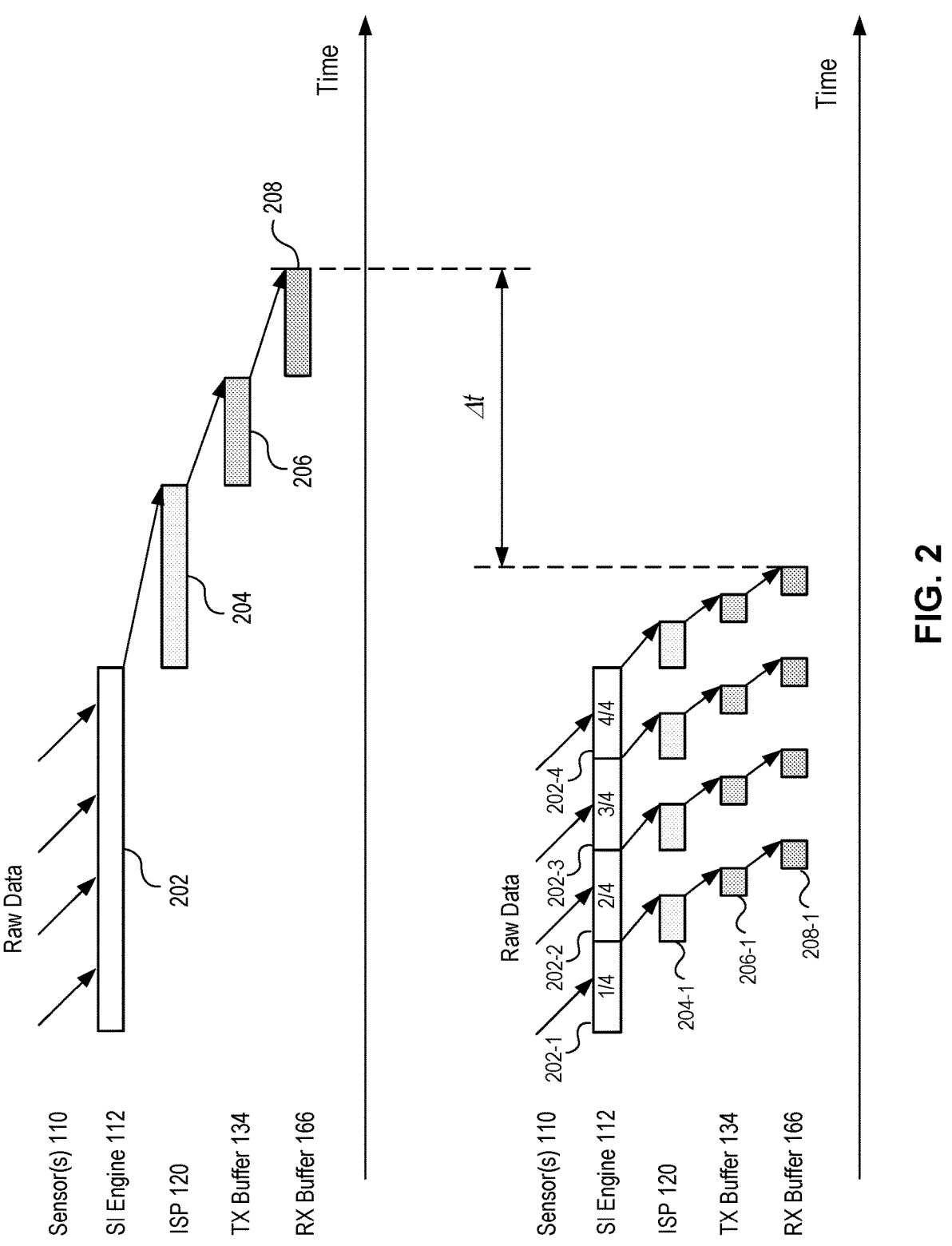
FIG. 2 is a schematic illustration of a timing of fractionalized data transfers between processing devices in live streaming and/or time-sensitive applications, according to at least one embodiment.

FIG. 2 is a schematic time diagram illustrating fractionalized data transfers between processing devices in live streaming and/or time-sensitive applications, according to at least one embodiment. The top portion in FIG. 2 illustrates conventional full-image data transfers. More specifically, sensor(s) 110 outputs raw pixels of CSI data that are received by SI engine 112. SI engine 112 deserializes raw data (e.g., raw pixels) and provides the deserialized data to ISP 120, as depicted schematically with a box 202 whose horizontal extent illustrates a duration of the SI processing. ISP 120 then generates an image (e.g., a demosaiced image) as depicted schematically with a box 204 whose horizontal extent illustrates a duration of the image processing. The generated image is stored in TX buffer 134, as indicated schematically with a box 206 whose horizontal extent illustrates the time of the storage operation. The image is subsequently communicated from TX buffer 134 to RX buffer 166, as indicated schematically with a box 208 whose horizontal extent illustrates the time for the data transfer between SoCs.

The bottom portion of FIG. 2 illustrates fractionalized image data transfers. At the start of image processing and transfer, the first SoC 102 may communicate a parcel reference (not shown) to the second SoC 150, which may include pointers to TX buffer 134, status buffer 164, RX buffer 166, and may further establish a synchronization primitive to indicate a completion of a parcel transfer completion. Each parcel may include one or more images (frames). Similarly to the full-image data transfer illustrated in the top portion of FIG. 2, sensor(s) 110 may output raw data that is received by SI engine 112. After SI engine 112 processes (e.g., deserializes) the first 1/Mth portion of the input raw data (the case of M=4 is illustrated for concreteness), the first portion may be passed to ISP 120, as indicated with box 202-1 whose horizontal extent illustrates the time for processing the first 1/Mth portion of the raw data and may be approximately 1/M of the time for processing the full data (box 202). Additionally, SI engine 112 may check for various errors in raw data, such as a truncated frame, missing an end-of-frame (EOF) indicators, missing end-of-line (EOL) indicators, presence of pixels of a wrong data type, errors in checksums and/or other EC or parity symbols, and/or the like. ISP 120 then generates the first 1/Mth portion of the frame (box 204-1 of approximately 1/M of the extent of box 204). The first portion of the frame may then be stored in TX buffer 134 (box 206-1 of approximately 1/M of the extent of box 206). Once the first portion is received in TX buffer 134, the first portion may be communicated from TX buffer 134 to RX buffer 166, as indicated schematically with a box 208-1 whose horizontal extent illustrates the time for the data transfer between SoCs and is about 1/M of the time for communicating the full image (box 206). Similarly, once the subsequent portions of the raw data are processed by SI engine 112 (boxes 202-2, 202-3, and 202-4) and transformed by ISP 120 into the respective portions of the image (frame) (boxes 204-2, 204-3, and 204-4), these portions of the image (frame) may be stored in TX buffer 134 (boxes 206-2, 206-3, and 206-4), and subsequently communicated to RX buffer 166 (boxes 208-2, 208-3, and 208-4). Prior to communicating each portion of the image (frame) to the second SoC 150, error check module 132 of TX controller 130 may verify that the raw data received from sensor(s) 110 did not have errors (e.g., by receiving the checksum or other parity data from error detection module 118 of SI engine 112) and may further verify that no additional errors have occurred during processing by ISP 120. TX controller 130 may update status buffer 164 with an indication that the full image (frame) has been communicated to RX buffer 166. In some embodiments, status buffer 164 may be updated after each portion of the image (frame) is communicated to RX buffer 166. After the image (frame) is received by RX controller 160, error check module 162 of RX controller 160 may perform error detection/correction of the received image (frame) and pass the image frame to CV application 170, if no errors are detected. In some embodiments, error check module 162 of RX controller 160 may perform error detection/correction for individual portions of the received image (frame) prior to passing the individual portions to CV application 170. The advantages of the fractionalized data communication illustrated in FIG. 2 include faster (as shown by the reduction time Δt) delivery of images (frames) to the second SoC 150 (or any other receiving device) and a more uniform temporal distribution of data traffic between SI engine 112 and ISP 120, between ISP 120 and TX buffer 134, and between TX buffer 134 and RX buffer 166.

Figures 3A, 3B:
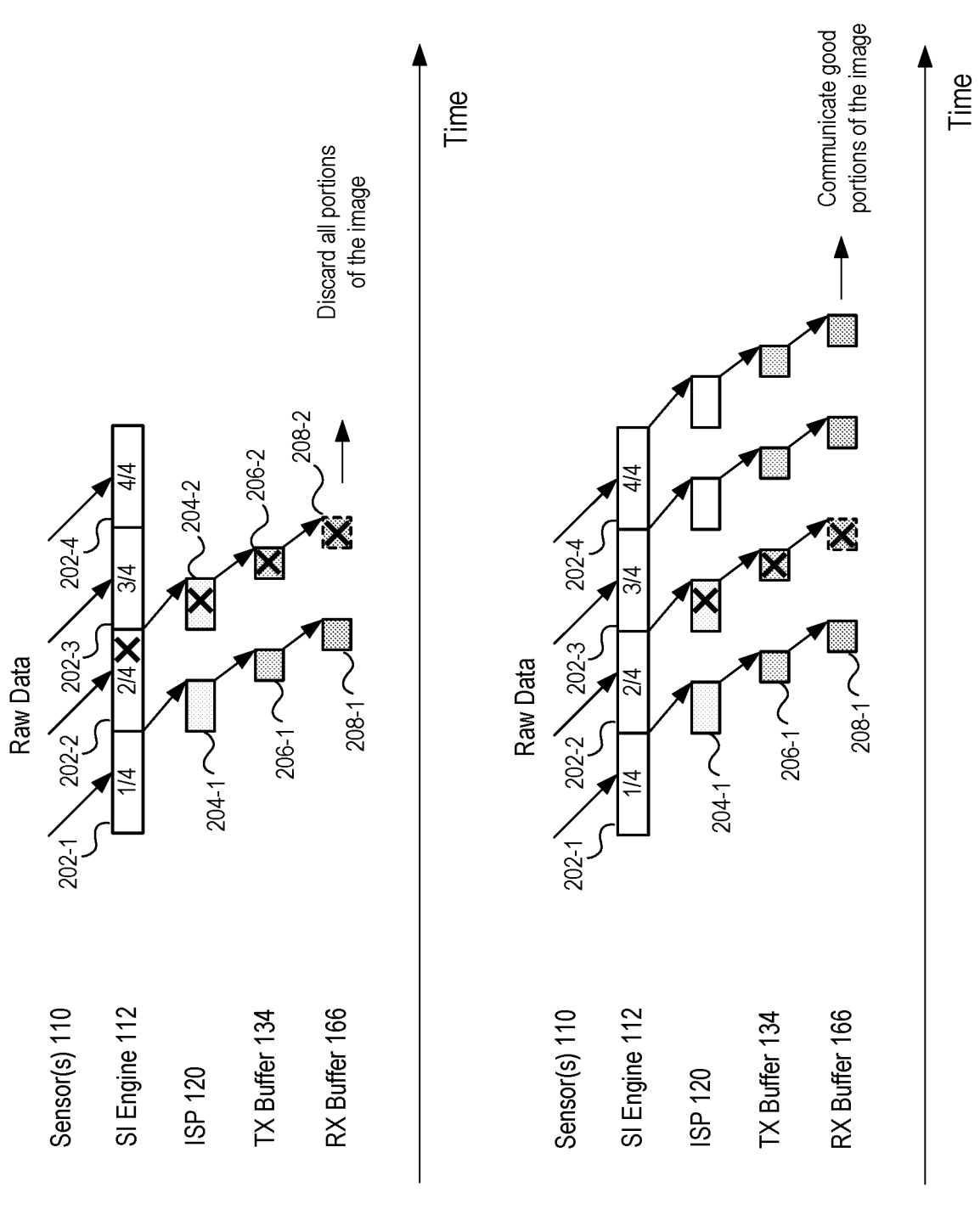
FIGS. 3A-B are schematic time diagrams illustrating fractionalized data transfers between processing devices in live streaming and/or time-sensitive applications in the instances of detection of unrecoverable errors, according to at least one embodiment.

FIGS. 3A-B are schematic time diagrams illustrating fractionalized data transfers between processing devices in live streaming and/or time-sensitive applications in the instances of detection of unrecoverable errors, according to at least one embodiment. Errors may be caused by electromagnetic interference, power instabilities, mechanical shaking or impact, and/or for any other reasons. Errors may include any errors in raw data, e.g., as detected by error detection module 118 of SI engine 112, any errors that occurred during processing by ISP 120 or storage in TX buffer 134, e.g., as detected by error check module 132 of TX controller 130, or any errors that occurred during transmission from TX buffer 134 to RX buffer 166, e.g., as detected by error check module 162 of RX controller 160, and/or any other detected errors. Error detection may be performed using Reed-Solomon EC codes, Hamming EC codes, single error correction/double error detection codes, or any other suitable EC codes. In some instances, such as when the detected errors are recoverable, transfers of the repaired image (frame) may occur as disclosed above in conjunction with FIG. 2. In those instances, where the detected errors are not recoverable (e.g., where some data is missing or where the number of errors exceeds the capacity of the used EC codes), as depicted schematically with a cross in the respective box, the corresponding portion of the image (frame) may be discarded. For example, as illustrated in FIG. 3A, if an unrecoverable error (e.g., missing pixels or lines of pixels) occurs in the raw data (as indicated by the cross in box 202-2), the subsequent processing by ISP 120 may result in the corrupted portion of the image (frame) being generated (e.g., as indicated by the cross in box 204-4) and stored in TX buffer 134 (e.g., as indicated by the cross in box 206-4).

In some instances, the raw data may be error-free but the error may occur during processing by ISP 120 and/or storing in TX buffer 134. In some embodiments, the corrupted portion(s) of the image (frame) may still be transferred to RX buffer 166 (box 208-2), e.g., together with an indicator or flag stored in status buffer 164 indicating that the corresponding portion of the image frame (e.g., the second portion in the example of FIG. 3A) is to be discarded. In some embodiments, as illustrated with the dashed box 208-2, the corrupted portion of the image (frame) is not transferred to RX buffer 166 whereas the indication of the corrupted portion(s) may still be stored in status buffer 164 or RX buffer 166. In some embodiments, where the corrupted portion(s) is not transferred to RX buffer 166, RX controller 160 may determine that the corresponding portion(s) is (are) missing, e.g., from a gap in the portion identifier obtained from the next arrived portion (which may belong to the same or a subsequent image).

In some embodiments, once a corrupted portion of an image (frame) has been detected, the previously communicated portions of the same image (frame) may be discarded. For example, as illustrated in FIG. 3A, the previously received first portion of the same image (frame) may be discarded. The subsequent portions of the same image (frame), if generated, may also be discarded. Status buffer 164 may be updated with an indication that the image (frame) is being scrapped. In some embodiments, once a corrupted portion of a frame has been detected, TX controller 130 may stop communicating subsequent portions of the same image (frame) to the second SoC 150. In some embodiments, the subsequent portions may still be communicated to the second SoC 150 where RX controller 160 may discard all received portions of the frame without communicating any of the portions to CV application 170.

In some embodiments, only the corrupted portions of the image (frame) may be discarded whereas good (uncorrupted or successfully repaired) portions of the same image (frame) may be transferred to the second SoC 150. For example, as illustrated in FIG. 3B, the second portion of the frame may be discarded whereas the first portion, the third portion, and the fourth portion may be transferred to RX buffer 166. Status buffer 164 may be updated with an indication which portions are discarded and which portions are transmitted. In some embodiments, all portions including the corrupted portion(s), may be transferred to the second SoC 150, whereas an indicator specifying a corrupted region (e.g., corrupted range of pixels or line of pixels) may be stored in status buffer 164. Correspondingly, RX controller 160 may discard the corrupted region and communicate uncorrupted region(s) of the corrupted portion to CV application 170.

FIGS. 4-7 are flow diagrams of example methods 400-700 of fractionalized data transfers between processing devices in live streaming and/or time-sensitive applications, according to some embodiments of the present disclosure. Methods 400-700 may be performed in the context of autonomous driving applications, industrial control applications, provisioning of streaming services, video monitoring services, computer-vision based services, artificial intelligence and machine learning services, mapping services, gaming services, virtual reality or augmented reality services, and many other contexts, and/or in systems and applications for providing one or more of the aforementioned services. Methods 400-700 may be performed using one or more processing units (e.g., CPUs, GPUs, accelerators, PPUs, DPUs, etc.), which may include (or communicate with) one or more memory devices. In at least one embodiment, methods 400-700 may be performed using the first SoC 102 and the second SoC 150 of FIG. 1. In at least one embodiment, processing units performing any of methods 400-700 may be executing instructions stored on a non-transient computer-readable storage media. In at least one embodiment, any of methods 400-700 may be performed using multiple processing threads (e.g., CPU threads and/or GPU threads), individual threads executing one or more individual functions, routines, subroutines, or operations of the method. In at least one embodiment, processing threads implementing any of methods 400-700 may be synchronized (e.g., using semaphores, critical sections, and/or other thread synchronization mechanisms). Alternatively, processing threads implementing any of methods 400-700 may be executed asynchronously with respect to each other. Various operations of any of methods 500 and/or 600 may be performed in a different order compared with the order shown in FIGS. 4-7. Some operations of any of methods 400-700 may be performed concurrently with other operations. In at least one embodiment, one or more operations shown in FIGS. 4-7 may not always be performed.

FIG. 4 is a flow diagram of an example method 400 of fractionalized data transfers, as may be performed by a transmitting device, according to at least one embodiment. At block 410, method 400 may include processing, by a first processing device (e.g., SoC 102 in FIG. 1), an image data (e.g., raw pixel data) to generate a plurality of portions of an image. The image may be (or include) a video frame of a video (or any other time sequence of images) collected by a video camera or any other sensing device, including a lidar device, a radar device, a sonar device, and the like. In some embodiments, "image data" should be understood to include audio data that is being streamed together with visual imagery. In some embodiments, "image data" should be understood any digital data, e.g., audio data streamed without visual imagery, any other sensor data (e.g., industrial process monitoring data), or any digital data that is apportioned between discrete units (referred to as "images" herein), which may be associated with different timestamps. At block 420, responsive to generating a first portion of the plurality of portions of the image, the first processing device may store the first portion in a first memory device (e.g., TX buffer 134) of the first processing device. The terms "first portion" and "second portion" should be understood throughout this disclosure as indicators of any portions of the image and do not imply any temporal, logical, or contextual order.

At block 430, method 400 may continue with the first processing device setting a completion indicator for the first portion. In some embodiments, the completion indicator may be set on the first processing device. In some embodiments, the completion indicator may be set on the second processing device (e.g., in status buffer 164 of RX controller 160 or any other suitable memory device). As indicated with the top callout portion of FIG. 4, at block 432, setting the completion indicator for the first portion may be responsive to a hardware interrupt detecting that a predetermined fraction of the image has been generated (e.g., one half of the image, one quarter of the image, and so on).

At block 440, method 400 may continue with causing the first portion to be provided to the second processing device. In some embodiments, as indicated with the bottom callout portion of FIG. 4, causing the first portion to be provided to the second processing device may be performed using a number of options. In some embodiments, as indicated with block 442, the first processing device may perform a direct write operation to store the first portion in a second memory device (e.g., RX buffer 166) of the second processing device. In some embodiments, as indicated with block 444, the first processing device may provide the completion indicator to the second processing device to cause the second processing device to perform a read operation to fetch the first portion from the first memory device. Blocks 420-440 may be repeated for other portions of the same image and for other images being streamed. In some embodiments, the first portion is provided from the first processing device to the second processing device via a Peripheral Component Interconnect Express (PCIe) connection, a Compute Express Link (CXL) connection, or an NVLink connection.

Figure 5:
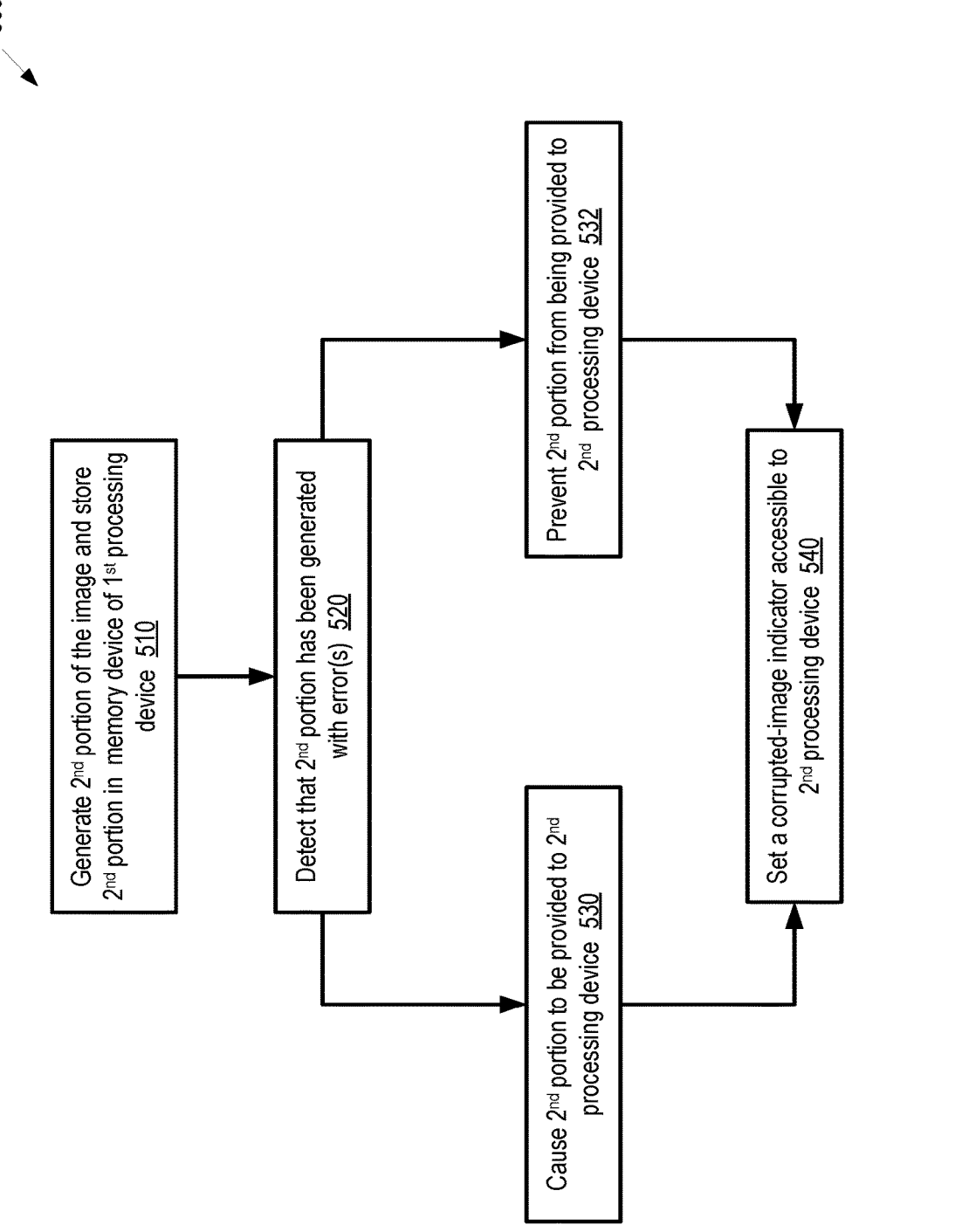
FIG. 5 is a flow diagram of an example method of fractionalized data transfers with uncorrectable errors, as may be performed by a transmitting device, according to at least one embodiment.

FIG. 5 is a flow diagram of an example method 500 of fractionalized data transfers with uncorrectable errors, as may be performed by a transmitting device, according to at least one embodiment. Method 500 may be performed together with method 400, in some embodiments. Method 500 may include generating a second portion of a plurality of portions of an image. In some instances, the second portion and the first portion may be portions of the same image. The second portion may be generated prior to the first portion, after the first portion, or concurrently with the first portion (e.g., in the instances where multiple portions are generated in parallel.) At block 510, responsive to generating the second portion, the first processing device may store the second portion in the first memory device.

At block 520, method 500 may continue with the first processing device detecting that the second portion has been generated with one or more errors. In some embodiments, method 500 may include causing, at block 530, the second portion to be provided to the second processing device (e.g., as described above in conjunction with blocks 442-444 of method 400). In some embodiments, responsive to detecting that the second portion has been generated with one or more errors, the first processing device may prevent the second portion from being provided to the second processing device (e.g., the second portion may be discarded).

At block 540, method 500 may include setting a corrupted-portion indicator accessible to the second processing device. In some embodiments, the corrupted-portion indicator may include an identification of the image. In some embodiments, the corrupted-portion indicator may include an identification of the second portion. In some embodiments, the corrupted-portion indicator may include an identification of a corrupted region of the second portion (bad region indicator), an uncorrupted region of the second portion (good region indicator), or both.

Figure 6:
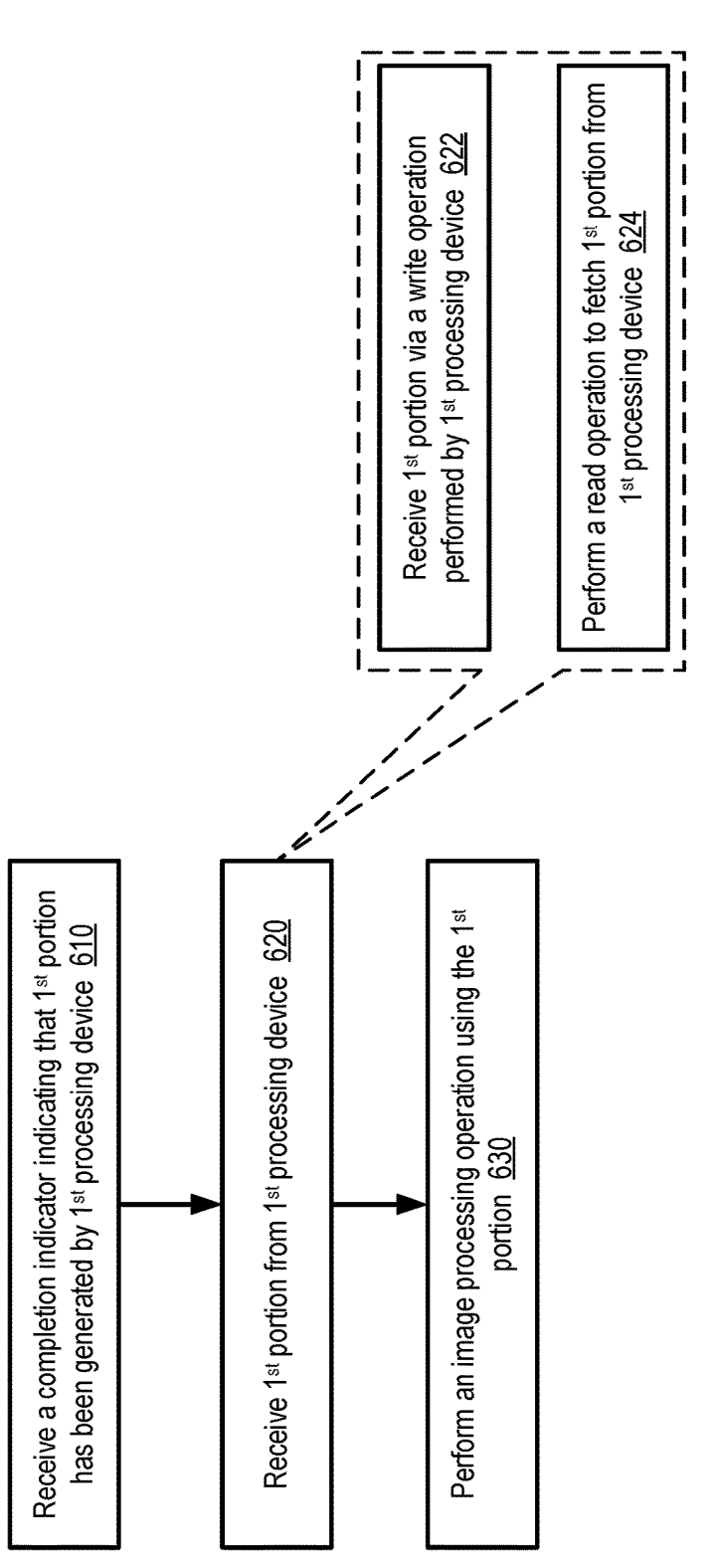
FIG. 6 is a flow diagram of an example method of fractionalized data transfers, as may be performed by a receiving device, according to at least one embodiment.

FIG. 6 is a flow diagram of an example method 600 of fractionalized data transfers, as may be performed by a receiving device, according to at least one embodiment. At block 610, method 600 may include receiving, from a first processing device by a second processing device, a completion indicator indicating that a first portion of a plurality of portions of an image has been generated by the first processing device. In some embodiments, the completion indicator may be set on the first processing device. In some embodiments, the completion indicator may be set on the second processing device (e.g., in status buffer 164 of RX controller 160). At block 620, method 600 may continue with receiving, from the first processing device by the second processing device, the first portion. In some embodiments, as indicated with the callout portion of FIG. 6, receiving the first portion may be performed using a number of options. In some embodiments, as indicated with block 622, method 600 may include receiving the first portion via a write operation performed by the first processing device. The write operation may store the first portion in a memory device of the second processing device (e.g., in RX buffer 166). In some embodiments, as indicated with block 624, the first portion may be received via a read operation performed by the second processing device. The read operation may store the first portion in the memory device of the second processing device. At block 630, method 600 may continue with performing, by the second processing device, an image processing operation using the received first portion. The image processing operation may include object recognition performed (or any other computational operation) using at least the first portion.

Figure 7:
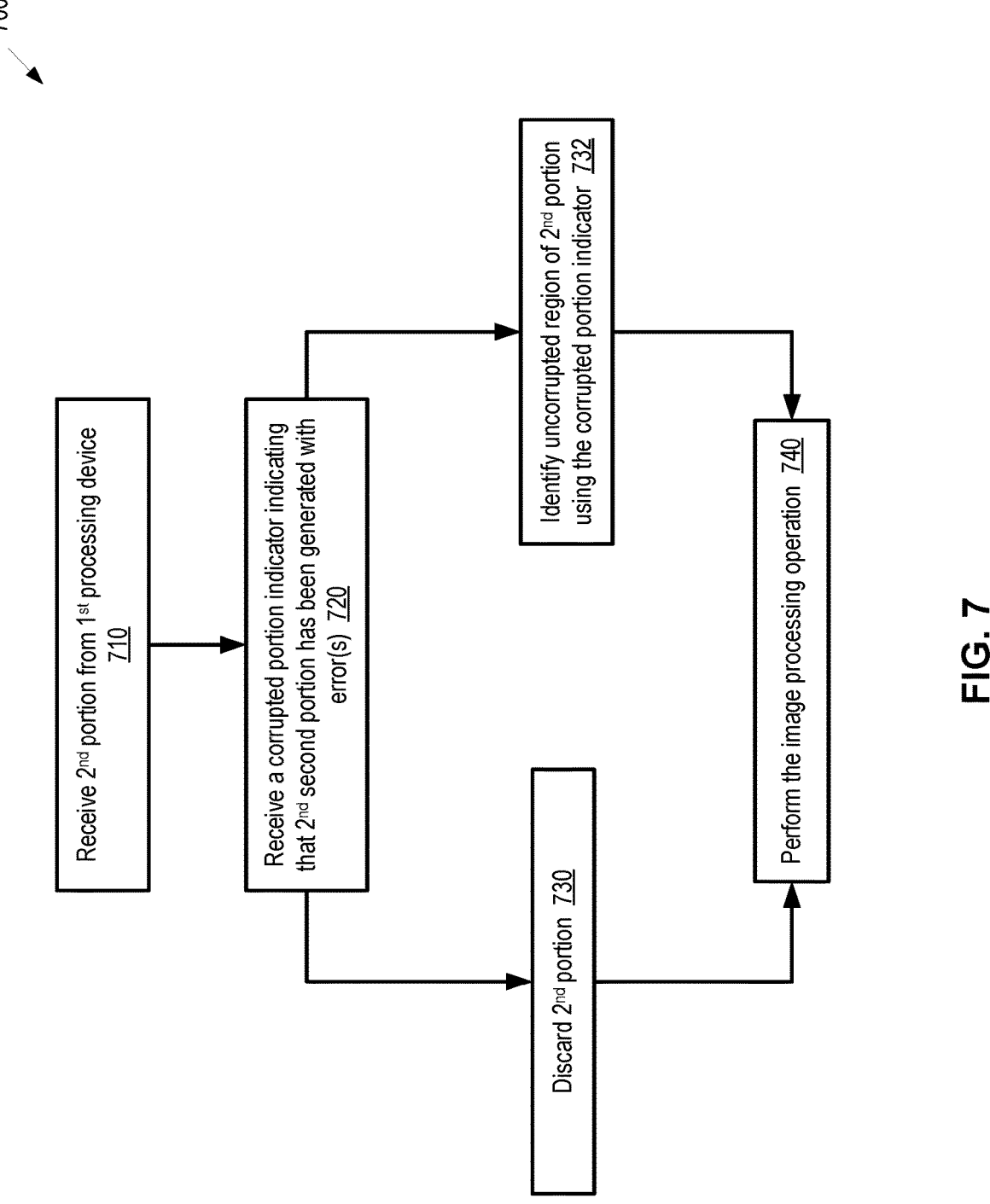
FIG. 7 is a flow diagram of an example method of fractionalized data transfers with uncorrectable errors, as may be performed by a receiving device, according to at least one embodiment.

FIG. 7 is a flow diagram of an example method 700 of fractionalized data transfers with uncorrectable errors, as may be performed by a receiving device, according to at least one embodiment. Method 700 may be performed together with method 600, in some embodiments. At block 710, method 700 may include receiving, from the first processing device by the second processing device, a second portion of the plurality of portions of the image. In some instances, the second portion and the first portion may be portions of the same image. The second portion may be generated prior to the first portion, after the first portion, or concurrently with the first portion (e.g., in the instances where multiple portions are generated in parallel.) At block 720, method 700 may include receiving, from the first processing device by the second processing device, a corrupted-portion indicator indicating that the second portion has been generated with one or more errors. In some embodiments, the corrupted-portion indicator may further specify a corrupted region of the second portion, e.g., a bad region indicator identifying a range of corrupted pixels or lines of pixels and/or a good region indicator identifying a range of uncorrupted pixels or lines of pixels. At block 730, method 700 may include discarding the second portion, e.g., preventing the second portion from being communicated to CV application 170, host application 190, and/or any other pertinent application. In some embodiments, as indicated by block 730, the corrupted-portion indicator may be used to identify an uncorrupted region of the second portion and provide the uncorrupted region to CV application 170, host application 190, and/or any other pertinent application. At block 740, method 700 may continue performing the image processing operation using the uncorrupted region of the second portion, e.g., as identified by the good region indicator.

Figure 8:
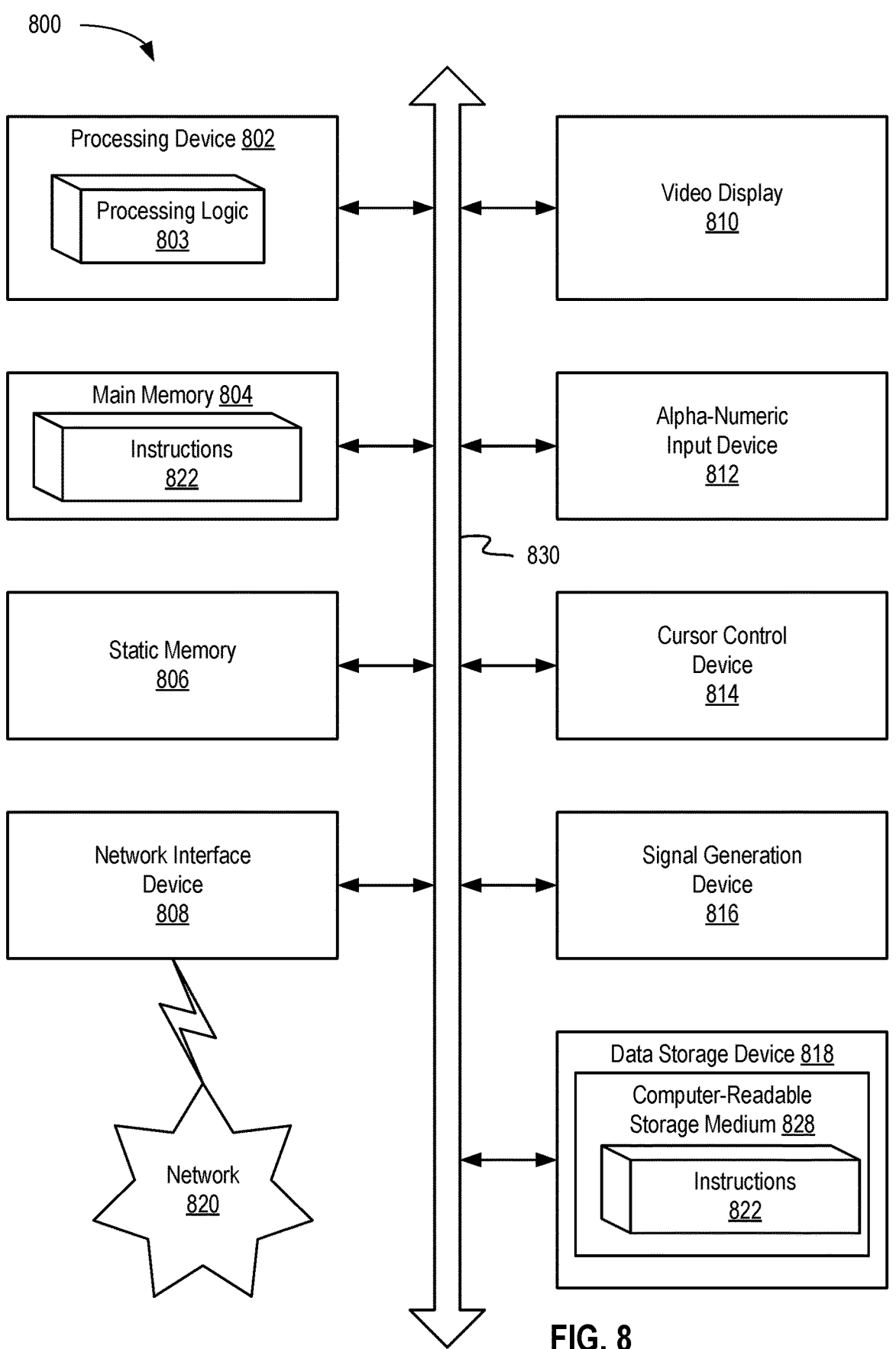
FIG. 8 depicts a block diagram of an example computer device capable of implementing fractionalized data transfers between processing devices in real-time data generating and streaming applications, according to at least one embodiment.

FIG. 8 depicts a block diagram of an example computer device 800 capable of implementing fractionalized data transfers between processing devices in real-time data generating and streaming applications, according to at least one embodiment. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions executing methods 400-700 of fractionalized data transfers between processing devices in live streaming and/or time-sensitive applications.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions executing method 400 of performing GPU remote direct memory access operations with memory-efficient packet processing.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    processing, using a first processing device, image data to generate a plurality of portions of an image;
    responsive to a generation of a first portion of the plurality of portions of the image, storing the first portion using a first memory device of the first processing device;
    determining that the first portion corresponds to a predetermined fraction of a size of the image;
    setting a completion indicator for the first portion based at least on determining that the first portion corresponds to the predetermined fraction of the size of the image, the completion indicator including at least one of a hardware interrupt or a software flag; and
    causing the first portion to be provided to a second processing device.

2. The method of claim 1, wherein the causing the first portion to be provided to the second processing device comprises:
    performing, using the first processing device, a write operation to store the first portion using a second memory device of the second processing device.

3. The method of claim 1, wherein the causing the first portion to be provided to the second processing device comprises:
    providing the completion indicator to the second processing device to cause the second processing device to perform a read operation to fetch the first portion from the first memory device.

4. The method of claim 1, wherein the first portion is provided to the second processing device via a Peripheral Component Interconnect Express (PCIe) connection, a Compute Express Link (CXL) connection, or an NVLink connection.

5. The method of claim 1, wherein the determining that the first portion corresponds to a predetermined fraction of the size of the image comprises detecting, using a hardware interrupt, that the predetermined fraction of the size of the image has been generated.

6. The method of claim 1, further comprising:
responsive to a generation of a second portion of the plurality of portions of the image, storing the second portion using the first memory device;
detecting that the second portion has been generated with one or more errors;
causing the second portion to be provided to the second processing device;
setting a corrupted-portion indicator accessible to the second processing device, wherein the corrupted-portion indicator comprises at least one of:
an identification of the image,
an identification of the second portion, or
an identification of a corrupted region of the second portion.

7. The method of claim 1, further comprising:
responsive to detecting that a second portion of the plurality of portions of the image has been generated with one or more errors, preventing the second portion from being provided to the second processing device.

8. The method of claim 1, wherein the first processing device is a system-on-chip device.

9. A system comprising:
a first processing device to:
process image data to generate a plurality of portions of an image,
responsive to generating a first portion of the plurality of portions of an image, store the first portion using a first memory device,
determine that the first portion corresponds to a predetermined fraction of a total size of the image,
set a completion indicator for the first portion of the image responsive to determining that the first portion corresponds to the predetermined fraction of the total size of the image, the completion indicator including at least one of a hardware interrupt or a software flag; and
cause the first portion to be stored in a second memory device; and
a second processing device to:
perform an image processing operation using the first portion,
wherein the first processing device is communicatively coupled to the first memory device and the second processing device is communicatively coupled to the second memory device.

10. The system of claim 9, wherein the first processing device is further to:
perform a write operation to store the first portion using the second memory device.

11. The system of claim 9, wherein the second processing device is further to:
responsive to the completion indicator provided by the first processing device, perform a read operation to fetch the first portion from the first memory device.

12. The system of claim 9, wherein the second processing device is further to:
receive a second portion of the plurality of portions of the image;

receive a corrupted-portion indicator indicating a corrupted region of the second portion; and
perform the image processing operation using the second portion and the corrupted-portion indicator.

13. The system of claim 9, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of augmented reality content, virtual reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

14. A system comprising:
a first memory device; and
a first processing device communicatively coupled to the first memory device, the first processing device to:
process image data to generate a plurality of portions of an image;
store, responsive to a generation of a first portion of the plurality of portions of the image, the first portion in the first memory device;
determine that the first portion corresponds to a predetermined fraction of a size of the image;
set a completion indicator for the first portion based at least on determining that the first portion corresponds to the predetermined fraction of the size of the image, the completion indicator including at least one of a hardware interrupt or a software flag; and
cause the first portion to be provided to a second processing device.

15. The system of claim 14, wherein to cause the first portion to be provided to the second processing device, the first processing device is to:
perform a write operation to store the first portion in a second memory device of the second processing device.

16. The system of claim 14, wherein to cause the first portion to be provided to the second processing device, the first processing device is to:
provide the completion indicator to the second processing device to cause the second processing device to perform a read operation to fetch the first portion from the first memory device.

17. The system of claim 14, wherein the first portion is provided to the second processing device via a Peripheral Component Interconnect Express (PCIe) connection, a Compute Express Link (CXL) connection, or an NVLink connection.

18. The system of claim 14, wherein to determine that the first portion corresponds to a predetermined fraction of the size of the image, the first processing device is to:

detect, using a hardware interrupt, that a predetermined fraction of the size of the image has been generated.

19. The system of claim 14, wherein the first processing device is further to:

store, responsive to a generation of a second portion of the plurality of portions of the image, the second portion in the first memory device;

detect that the second portion has been generated with one or more errors;

cause the second portion to be provided to the second processing device;

set a corrupted-portion indicator accessible to the second processing device, wherein the corrupted-portion indicator comprises at least one of:

an identification of the image, an identification of the second portion, or an identification of a corrupted region of the second portion.

20. The system of claim 14, wherein the first processing device is further to:

prevent, responsive to detecting that a second portion of the plurality of portions of the image has been generated with one or more errors, the second portion from being provided to the second processing device.

21. The system of claim 14, wherein the first processing device is a system-on-chip device.

\* \* \* \* \*